Figure 1:
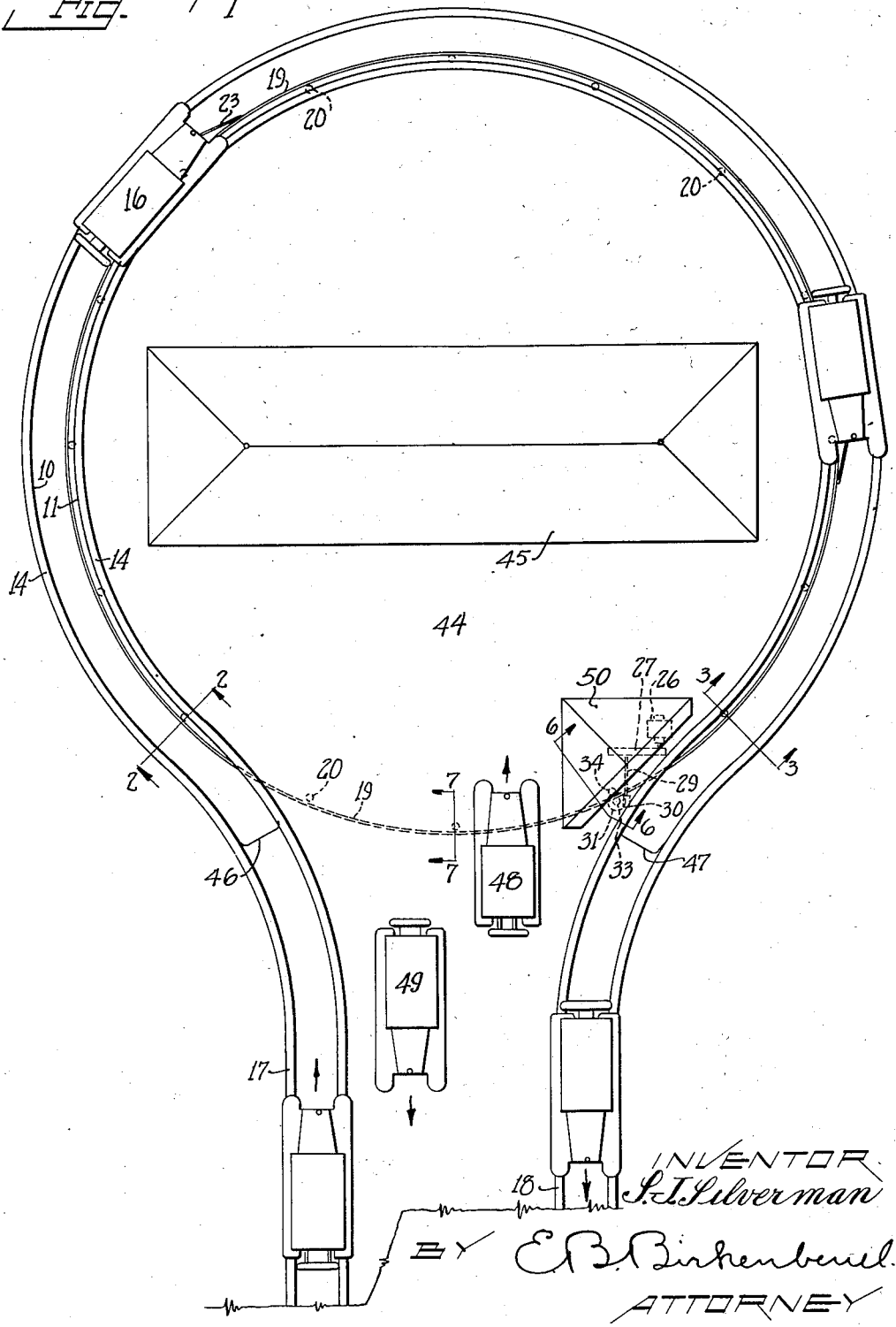

May 7, 1935. S. J. SILVERMAN 2,000,151
WASH RACK FOR AUTOMOBILES
Filed May 10, 1927 2 Sheets-Sheet 1

May 7, 1935.  S. J. SILVERMAN  2,000,151
WASH RACK FOR AUTOMOBILES
Filed May 10, 1927   2 Sheets-Sheet 2
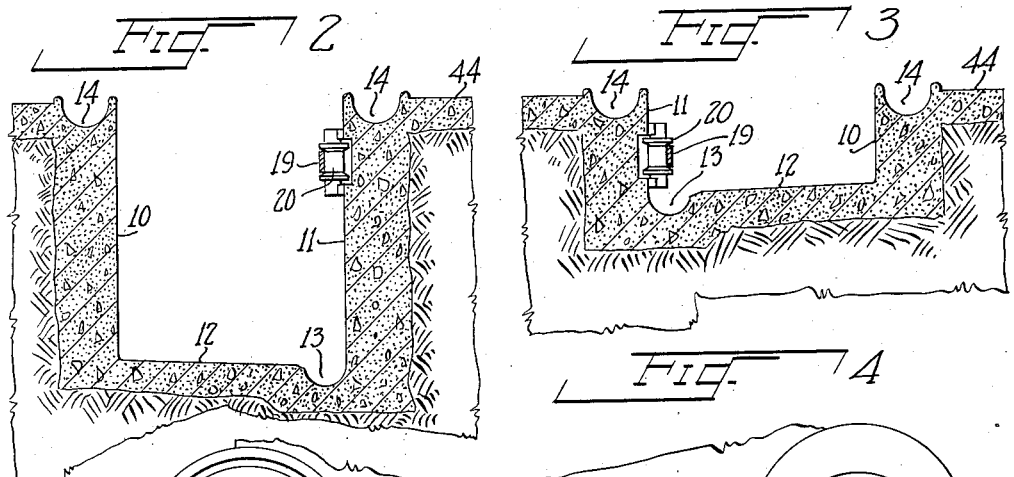
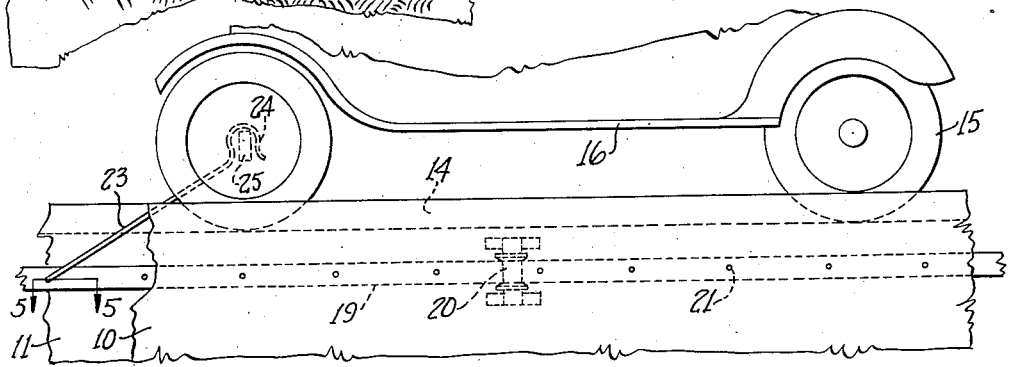
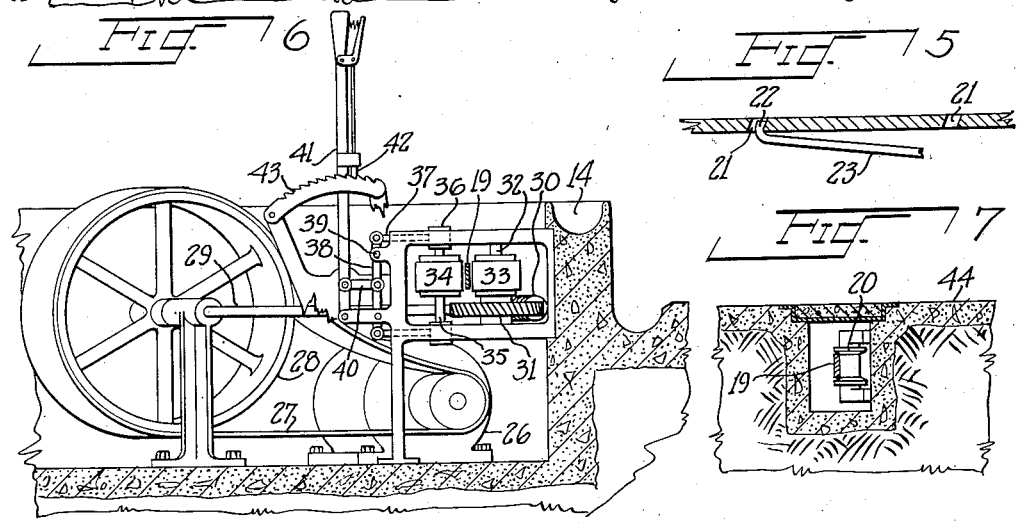
INVENTOR
S. J. Silverman
BY E. B. Birkenbeuel
ATTORNEY Patented May 7, 1935

2,000,151

UNITED STATES PATENT OFFICE 2,000,151

WASH RACK FOR AUTOMOBILES

Samuel J. Silverman, Portland, Oreg., assignor to Gillespie Auto Laundry System, Inc., Chicago, Ill., a corporation of Delaware Application May 10, 1927, Serial No. 190,365

2 Claims. (Cl. 104—172)

This invention relates generally to the automotive industry, and particularly to a rack for washing and otherwise servicing automobiles.

The first object of this invention is to provide an exceedingly simple and efficient wash rack on which automobiles are moved on their own running gear in a somewhat circular path and in which the various operations are performed by workmen stationed along the path of the automobile.

The second object is to reduce the time required for washing an automobile and improve the quality of the work accomplished by having each operation performed by a special operator.

The third object is to reduce the first cost of construction of the rack to a point far below that of the rotatable washing rack now in common use.

The fourth object is to provide a novel form of drive whereby each car is towed around in a circular path by a special means provided therefor.

The fifth object is to make it possible to utilize the space within the washing circle for grease racks, stores, filling stations or other purposes.

These, and other objects, will become more apparent from the specification following as illustrated in the accompanying drawings, in which:

Figure 1 is a plan of the representative form of the device of which Figure 2 is an enlarged vertical section taken along the line 2—2 in Figure 1. Figure 3 is an enlarged vertical section taken along the line 3—3 in Figure 1. Figure 4 is a fragmentary side elevation of an automobile showing same mounted on the device and showing the towing connection. Figure 5 is a horizontal section taken along the line 5—5 in Figure 4. Figure 6 is a vertical section through the pit containing the drive mechanism taken along the line 6—6 in Figure 1. Figure 7 is a vertical section taken along the line 7—7 in Figure 1. Figure 8 shows the bar for connecting a car to the driving belt.

Similar numbers of reference refer to similar parts throughout the several views.

Referring in detail to the drawings, there is constructed a somewhat circular pit consisting of the two side walls 10 and 11 between which is placed a floor 12 having a drainage gutter 13 at one side thereof. The walls 10 and 11 have formed in their upper portions the rounded grooves 14 which are spaced to receive the standard gage of wheels 15 of the automobile 16. The walls 10 and 11, instead of forming a complete circle, terminate at their ends in the straight portions 17 and 18.

Near the upper edge of the wall 11 is mounted a car towing band 19 on the rolls 20 which permit the band 19 to travel freely in a circular path. The band 19 is provided with holes 21, preferably somewhat angling, to receive the hook 22 of the bar 23, whose axle-engaging hook 24 can be easily slipped over the front axle 25 of the automobile 16.

The drive itself consists of a motor 26 whose belt 27 drives the large pulley 28 on the shaft 29, on which shaft is mounted a worm 30 which meshes with a worm wheel 31 on the axle 32 on which is secured the friction wheel 33, which is normally out of engagement with the car towing band 19. On the opposite side of the band 19 from the wheel 33 is a second friction wheel 34 which is mounted on the shaft 35 whose slidable bearings 36 are connected by the rods 37 to the rock levers 38, which are pivotally mounted on the pins 39 and joined by a connecting rod 40 to the hand lever 41, which can be held in any desired position by the ratchet 42 which engages the notched segment 43.

On the floor 44 inside of the wall 11 can be disposed any desired arrangement of stores, racks or filling stations, without departing from the spirit of this invention.

In the drawings there is indicated the roof 45 of a building merely to illustrate the working of the device.

In operation an automobile 16 is driven onto the runway 17 which preferably slopes downwardly toward the end 46 of the pit. At this point an attendant places a hook 24 over the front axle of the machine and enters the end 22 of the bar 23 in an opening 21 of the car towing band 19. The band 19 is being driven by frictional contact with the rollers 33 and 34 by the proper manipulation of the lever 41.

The car 16 is now moved slowly around the circular path inscribed by the band 19, during which time successive attendants perform their various duties in the way of washing, dusting, polishing and otherwise servicing the various parts of the car, and these attendants are so spaced with relation to the travel of the car that by the time it reaches the end 47 of the pit the operation is complete and all that is necessary is to unhook the bar 23 and allow the car 16 to move out over the runway 18 from whence it can be driven away.

It will be observed that there is considerable space between the runways 17 and 18 to permit the cars 48 and 49 to enter and leave the circle for the purpose of gaining access to the various activities located therein.

A roof 50 is shown over the drive mechanism to protect it from the weather, and in certain climates it may be desirable to cover the entire rack, or certain portions thereof, with a roof, the construction of which would be evident to anyone familiar with building operations.

I claim:

1. Apparatus for use in connection with automobile washing systems comprising a runway having spaced apart linear portions along which respective lanes of automobiles are adapted to travel simultaneously in opposite directions and a connecting portion co-operable with said linear portions and over which automobiles are adapted to travel as the automobiles proceed from one of said linear portions and from which the automobiles are adapted to be transferred to the other one of said linear portions, power imparting means at said connecting portion, and means co-operable with the power imparting means for operatively connecting the latter with automobiles to move them over said connecting portion.

2. Apparatus for use in connection with automobile washing systems comprising a runway for automobiles; the same including a stationary and substantially circular portion around which the automobiles are adapted to be moved and respective entrance and exit stationary portions spaced apart from each other in relative parallelism substantially and co-operable with the circular portion to enable a continuous lane of automobiles to successively enter the circular portion from the entrance portion while another continuous lane of automobiles are successively conducted to the exit portion from the circular portion; means for slowly moving the automobiles around the circular portion as they pass thereinto from the entrance portion and to occupy positions for successive discharge onto the exit portion; and means in the circular portion and the entrance and exit portions for guiding the automobiles during translation thereof.

SAMUEL J. SILVERMAN.